(No Model.)

H. A. C. ANDERSON.
COMBINATION BATTERY CELL.

No. 578,131. Patented Mar. 2, 1897.

WITNESSES:
J. B. Walker
Fred Acker

INVENTOR:
H. A. C. Anderson.
BY Munn & Co
ATTORNEYS.

UNITED STATES PATENT OFFICE.

HENRY A. C. ANDERSON, OF NEW YORK, N. Y.

COMBINATION BATTERY-CELL.

SPECIFICATION forming part of Letters Patent No. 578,131, dated March 2, 1897.

Application filed October 30, 1895. Serial No. 567,339. (No model.)

*To all whom it may concern:*

Be it known that I, HENRY A. C. ANDERSON, of New York city, in the county and State of New York, have invented a new and Improved Combination Battery-Cell, of which the following is a full, clear, and exact description.

My invention relates to an improvement in dry battery-cells; and the object of the invention is to so construct the said cell that after its effective term of service as a dry cell has expired the said cell in its apparently exhausted condition may be revivified and used as a wet cell, being equally effective in both capacities.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
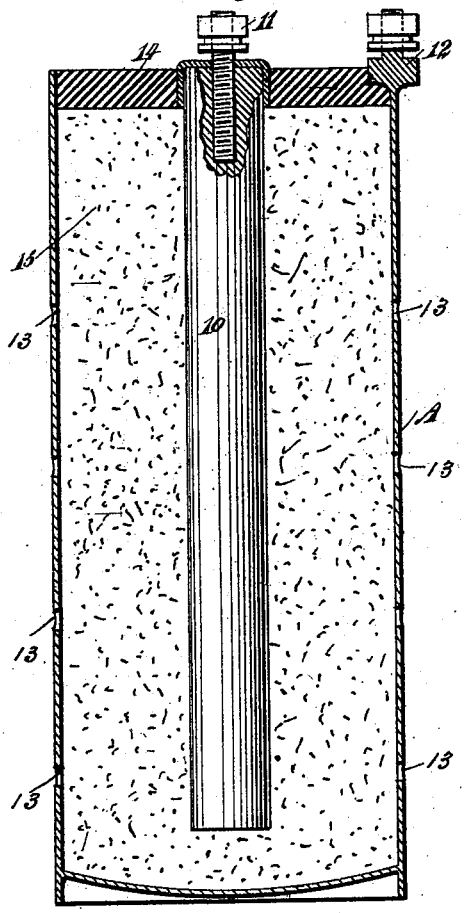
Figure 2:
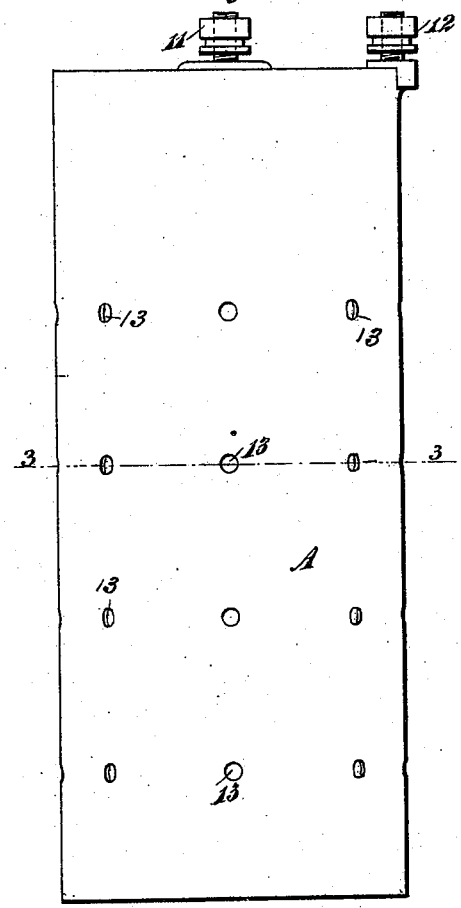
Figure 3:
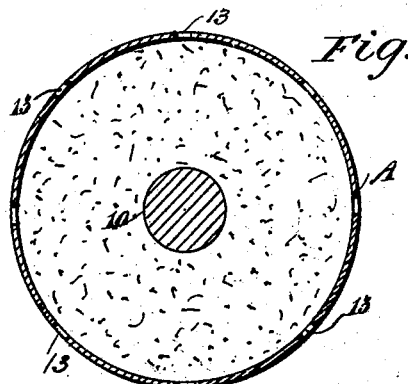
Figure 4:
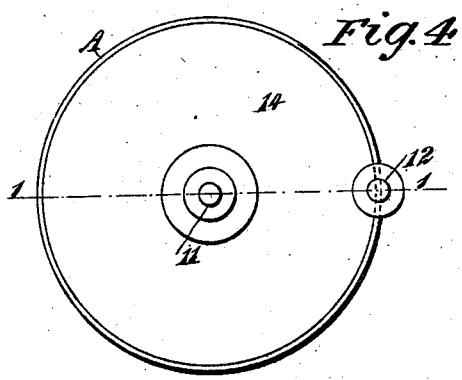

Figure 1 is a longitudinal vertical section through the improved cell, taken, practically, on the line 1 1 of Fig. 4. Fig. 2 is a side elevation of the same. Fig. 3 is a longitudinal section taken substantially on the line 3 3 of Fig. 2, and Fig. 4 is a plan view of the cell.

In carrying out the invention the cup A of the cell is made of zinc, and it may be amalgamated, if so desired. The cup A constitutes the positive electrode of the cell, and a carbon 10, located within the cell, is its negative electrode, being provided with a binding-post 11, and the positive electrode, namely, the cup, is provided with a binding-post 12.

The prime feature of this invention consists in producing any desired number of apertures 13 in the zinc cup, whereby in a measure the contents of the cup may be exposed to an exciting liquid in contact with the exterior of the cup of the cell when desired. The usually non-conducting cap 14 is located at the top of the cell, and the exciting-filling 15 may be of any desired character. When a dry cell is so constructed, after its term of effective service as such has expired the cell may be used, further, as a wet battery, it being simply necessary to place the cell in a cup or other receptacle containing a solution of sal-ammoniac or other exciting liquid, whereupon the exciting dry contents of the battery will be revivified and its electrodes will work in the usual manner. This double use of the dry battery is due solely to the aperturing of the zinc cup.

Having thus described my invention, I claim as new and desire to secure by Letters Patent—

1. A battery-cell, the same consisting of an external perforated zinc cup, a negative electrode within the cup, and an exciting-filling for said cup surrounding the said negative electrode, whereby when the said cell is exhausted it may be restored by placing it within a receptacle containing an exciting liquid, the perforations permitting the exciting liquid to come in contact with the filling, and the cell to be used again as a dry battery, or be employed as a wet battery by letting it remain within the said receptacle, substantially as described.

2. A battery-cell, the same consisting of an external apertured zinc cup provided with a non-conducting cap at the top, a negative electrode suspended within the cup, and an exciting-filling surrounding the said negative electrode, the apertures in the said cup permitting of the passage of an exciting liquid to the interior of the cup, whereby the said cell may be employed as a dry battery and when exhausted may be placed without change of parts within a receptacle containing an exciting liquid and be restored for use as a dry battery or may be employed as a wet battery, substantially as described.

HENRY A. C. ANDERSON.

Witnesses:
NELSON R. BLOW,
WM. B. ANDERSON.